United States Patent [19]

Lin

[11] Patent Number: 4,536,695

[45] Date of Patent: Aug. 20, 1985

[54] DISCHARGING PROTECTION DEVICE FOR BATTERY-OPERATED PORTABLE ELECTRIC LIGHT

[76] Inventor: Ming-Hsin Lin, 4, La. 110, Shui-Nan Rd., Pei-Ten District, Taichung City, Taiwan

[21] Appl. No.: 560,532

[22] Filed: Dec. 12, 1983

[51] Int. Cl.³ .......................... H02H 7/18; H02J 7/00
[52] U.S. Cl. ................................ 320/2; 307/10 BP; 320/13; 361/187; 362/183
[58] Field of Search ............... 320/2, 13, 14, 9; 362/183; 361/187, 194; 307/10 BP

[56] References Cited

U.S. PATENT DOCUMENTS

| | | | |
|---|---|---|---|
| 3,648,145 | 3/1972 | Meyer et al. | 320/13 |
| 4,005,344 | 1/1977 | Gaind et al. | 320/13 X |
| 4,132,942 | 1/1979 | Yamamoto | 320/13 |
| 4,342,953 | 8/1982 | Collins | 320/13 |

FOREIGN PATENT DOCUMENTS 649067  2/1979  U.S.S.R. ................... 320/13

OTHER PUBLICATIONS

"Remote Battery Cutoff", *Popular Science*, Jan., 1974, p. 26.

*Primary Examiner*—R. J. Hickey

[57] ABSTRACT

A discharging protection device for battery-operated portable electric lights includes a relay circuit having a normally-open contact and a load coil coupled in parallel with the light bulb and the negative terminal of the rechargeable battery set of the portable electric light, a normally-open push-button switch connected to the positive terminal of the rechargeable battery set at one end and to the stationary part of the normally-open contact of the relay circuit at the other, and a normally-closed push-button switch linked between the positive terminal of the rechargeable battery set and the movable part of the normally-open contact of the relay circuit; thereby, when the electric light equipped with this invention is carelessly left in discharging condition, the rechargeable battery set can be safely protected from being damaged by overdischarging.

7 Claims, 1 Drawing Figure

DISCHARGING PROTECTION DEVICE FOR BATTERY-OPERATED PORTABLE ELECTRIC LIGHT

BACKGROUND OF THE INVENTION

This invention relates to a discharging protection device for battery-operated portable electric light, particularly for those types having a rechargeable battery set such as lead-acid storage battery, whereby the rechargeable battery set can be safely protected from damage by overdischarging.

At present, the main cause of damage to the rechargeable battery set can be ascribed to overdischarging. As most of the portable electric lights are not equipped with a discharging protection device for their rechargeable battery sets, whenever the electric light is left on, for instance, out of neglect, the battery set thereof will continue discharging until the voltage of the battery set drops to the lowest level, even to zero value, resulting in damage to the battery plates of, for example, a lead-acid storage battery. Therefore, replacement of the storage battery is frequently required with the known portable electric lights. While, some protection devices are, of course, available in special purpose electric lights, they are usually built with complicated circuits and thus are bulky and have more components. Consequently, as a portable electric light for general purpose usually has a limited space therein, such conventional protection devices are not only expensive but also unsuitable for practical use in them.

SUMMARY OF THE INVENTION

It is accordingly a primary object of this invention to provide a discharging protection device for battery-operated portable electric lights so as to ameliorate the known protection devices and overcome the problems associated with conventional portable electric lights.

According to the present invention, this and other objects are achieved by providing a discharging protection device for the rechargeable battery set of portable electric lights, which device comprises a relay circuit having a normally-open contact coupled in parallel with the light bulb and the negative terminal of the rechargeable battery set of the portable electric light, a normally-open push-button switch connected to the positive terminal of the rechargeable battery set at one end and to the stationary part part of the normally-open contact of the relay circuit at the other, and a normally-closed push-button switch electrically linked between the positive terminal of the rechargeable battery set and the movable part of the normally-open contact of the relay circuit, so that discharging protection of the rechargeable battery set can be safely effected therewith.

With the above and other objects in view, this invention comprises certain features of construction and operation of the parts and assemblies which will be pointed out hereinafter and described in detail in connection with the accompanying drawing.

DETAILED DESCRIPTION OF THE PREFERRED EMBODIMENT

Figure 1:
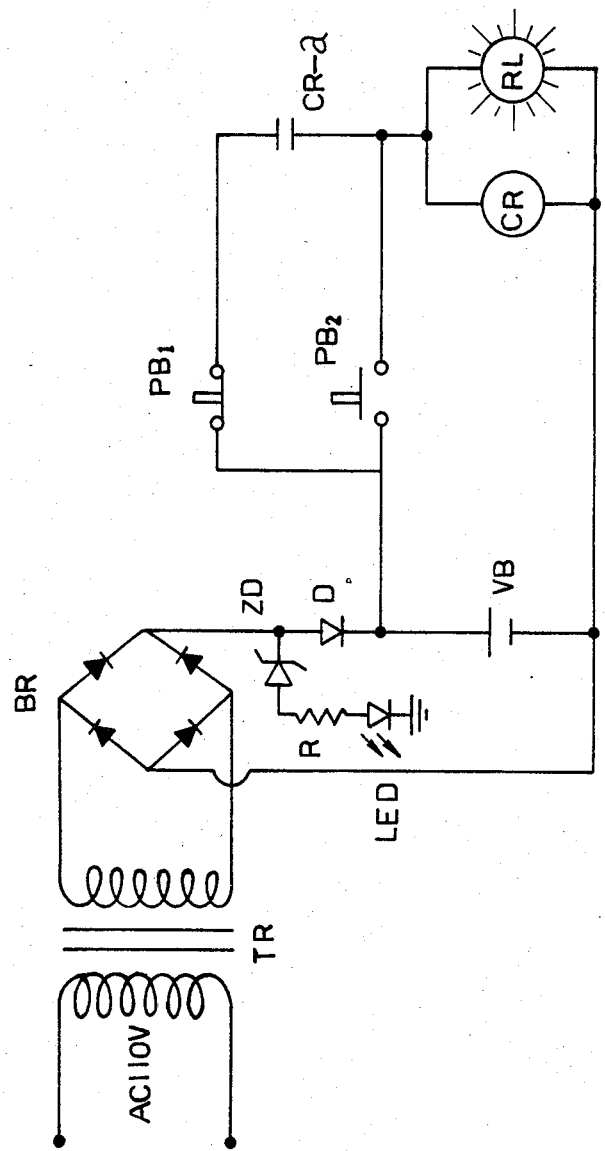
FIG. 1 is a circuit diagram of a preferred embodiment of the discharging protection device for the battery-operated electric light according to this invention.

Referring to FIG. 1, there is shown a preferred embodiment of a discharging protection device for the battery-operated portable electric light according to this invention, which electric light includes a charging circuit generally combined with a transformer TR with its primary winding connected to an A.C. power-source plug (not shown), a bridge rectifier BR with the input terminals linked to the secondary winding of the transformer TR and the output terminals respectively coupled with the storage battery VB through a diode D, and a zener diode ZD having its cathode connected to the positive output terminal of the bridge rectifier BR and its anode connected to the anode of a light emitting diode LED through a resistor R, and the cathode of the LED being grounded thereat. The preferred embodiment according to this invention resides in the discharging protection device, which comprises: a relay circuit CR having a normally-open contact CR-a and a load coil coupled in parallel with the negative terminal of the storage battery VB and the light bulb RL of the electric light; a normally-open push-button switch PB2 with one end connected to the positive terminal of the storage battery VB and the other end coupled in parallel with the load coil relating to the stationary part of the normally-open contact CR-a; and a normally-closed push-button switch PB1 connected between the positive terminal of the storage battery VB and the movable part of the normally-open contact CR-a.

Specifications and usage of the components provided for the preferred embodiment shown in FIG. 1 are as follows:

CR—a 6-volt relay with a load coil excitable only at the voltage level above the end voltage of the storage battery VB, where the end voltage is presumably set at 4 volts;

VB—a 6-volt lead-acid storage battery;

PB1—a normally-closed push-button switch having an elastic member arranged for effecting automatic recovery to the closed state after being pressed down (it is used for manually turning off the light bulb RL); and PB2—a normally-open push-button switch having an elastic member arranged for affecting automatic recovery to the open state after being pressed down (it is used for manually turning on the light bulb RL).

Operation of the preferred embodiment of the discharging protection device according to this invention is as shown in FIG. 1. When the storage battery VB is fully charged, the light emitting diode LED will be lit through the breakdown of the zener diode ZD, so that the current of the power source thereof will be shunted through the zener diode ZD instead of flowing into the storage battery VB. Thus, the storage battery VB is protected from being damaged by the act of overcharging. In operation the push-button switch PB2 is pressed down, the light bulb RL will be energized and the normally-open contact CR-a switched from an open circuit state to a closed circuit state through the energizing of the relay coil CR. At this time, the push-button switch PB2 automatically returns to its normally-open condition while the circuit of the push-button switch PB1 remains closed with respect to the storage battery VB. Therefore, the light bulb RL is continuously energized through the push-button switch PB1 and closed contact CR. In this case, if it is desired to turn off the light, the push-button switch PB1 is pressed down to cut off bulb RL and coil CR from the storage battery VB, and the light bulb RL will go off. At the same time, the nromally-open contact CR-a will also switch from its closed circuit state to an open circuit state along with the de-energizing of the relay circuit RC, leaving the PB1 circuit in open circuit condition with respect to the storage battery VB even when the switch PB1 is automatically returned to its normally closed circuit position. On the other hand, if the electric light equipped with the preferred embodiment of this invention is not turned off for some reason, such as neglect, the light bulb RL will be kept lit, and there will be continuous discharging of the storage battery VB. According to the preferred embodiment of this invention, when the voltage of the storage battery VB drops to the end-voltage level, which is presumably set at 4 volts, the load coil of the relay circuit RC will be automatically de-energized thereat, and the normally-open contact CR-a will switch from its closed circuit state to an open circuit state, leaving the PB1 circuit in complete cut-off condition with respect to the storage battery VB. Therefore, the storage battery VB is safely protected from being damaged by overdischarging, and its life expectancy thereof is extended accordingly.

While a preferred embodiment has been chosen to illustrate this invention, it will be understood by those skilled in the art that various changes and modifications can be made therein without departing from the scope of this invention as defined in the appending claims.

What I claims is:

1. A discharging protection device for battery-operated portable electric light having a charging circuit combined with a transformer, a bridge rectifier and a zener diode circuit coupled with a rechargeable battery set thereof, comprising:
   a relay circuit having a relay coil in parallel with the light bulb of the electric light and a normally-open relay contact connected to said light bulb;
   a first switch connected between the positive terminal of the rechargeable battery set and a movable part of said normally-open contact of said relay circuit; and a second switch coupled between the positive terminal of the rechargeable battery set and a stationary part of said normally-open contact of said relay circuit with respect to the light bulb of the electric light.

2. A discharging protection device according to claim 1 wherein said relay coil is characterized in that excitation is effected only at the voltage level above the end voltage predetermined for the rechargeable battery set.

3. A discharging protection device according to claim 1 wherein said first switch comprises a normally-closed push-button switch.

4. A discharging protection device according to claim 1 wherein said second switch comprises a normally-open push-button switch.

5. A discharge protection circuit comprising:
   (a) a battery;
   (b) a load;
   (c) a normally open-circuit switch;
   (d) a normally closed-circuit switch;
   (e) a relay having a coil and a normally open contact set, the coil being connected in parallel with the load and the contact set being connected in series with the normally closed-circuit switch; and
   (f) circuit means connecting the series connected contact set and said normally closed-circuit switch in parallel with the normally open-circuit switch which in turn are connected in series with said battery and said load.

6. A discharge protection circuit for a battery connected to a load, said circuit comprising:
   (a) a relay having a coil which is connected in parallel with the load;
   (b) normally open first switch means for temporarily energizing said load and coil; and
   (c) second switch means for continuing to energize said load and said coil after initial energization by said first switch means until the voltage output by the battery falls below a predetermined level, said second switch means including a manual switch and a contact of said relay wired in series and wherein said first switch means and said second switch means are connected together in parallel with each other and in series with the battery, the load and said coil.

7. The discharge protection circuit of claim 6, wherein said load is provided by a lamp.

* * * * *